United States Patent
Saban (10) Patent No.: US 12,556,565 B1
(45) Date of Patent: Feb. 17, 2026

(54) SYSTEM AND METHOD FOR DELAYED LOG INGESTION UTILIZING AGENTLESS COLLECTION

(71) Applicant: Wiz, Inc., New York, NY (US)

(72) Inventor: Ofir Saban, Netanya (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/296,400

(22) Filed: Aug. 11, 2025

(51) Int. Cl.
*H04L 29/06* (2006.01)
*H04L 9/40* (2022.01)

(52) U.S. Cl.
CPC ...... *H04L 63/1425* (2013.01); *H04L 63/1441* (2013.01)

(58) Field of Classification Search
CPC ............. H04L 63/1425; H04L 63/1441; H04L 63/0263; H04L 63/14; H04L 63/10; H04L 63/20

See application file for complete search history.

(56) References Cited

U.S. PATENT DOCUMENTS

| | | | |
|---|---|---|---|
| 5,966,706 A * | 10/1999 | Biliris | G06F 16/2358 707/999.102 |
| 8,285,681 B2 | 10/2012 | Prahlad et al. | |
| 9,584,536 B2 * | 2/2017 | Nantel | H04L 63/02 |
| 11,032,311 B2 | 6/2021 | Convertino et al. | |
| 11,238,057 B2 | 2/2022 | Bath et al. | |
| 11,604,715 B2 * | 3/2023 | Anderson | G06F 11/3476 |
| 11,620,157 B2 | 4/2023 | Sriharsha et al. | |
| 11,829,330 B2 | 11/2023 | Liang et al. | |
| 11,968,264 B2 | 4/2024 | Sathianarayanan et al. | |
| 2024/0395348 A1 * | 11/2024 | Brock-Petersen | G11C 29/12005 |

* cited by examiner

*Primary Examiner* — Longbit Chai
(74) *Attorney, Agent, or Firm* — M&B IP Analysts, LLC (57) ABSTRACT

A system and method for ingesting delayed logs for cybersecurity detection is presented. The method includes detecting a resource deployed in a computing environment, the resource configured to generate a local log on a disk of the resource; periodically fetching the local log from the disk, the local log including a plurality of event records written by at least a software application executed on the resource; applying a control on the fetched local log; and detecting a cybersecurity issue on the resource based on a result of applying the control.

21 Claims, 4 Drawing Sheets

SYSTEM AND METHOD FOR DELAYED LOG INGESTION UTILIZING AGENTLESS COLLECTION

TECHNICAL FIELD

The present disclosure relates generally to cybersecurity, and specifically to systems and methods for delayed ingestion of agentless log data collection.

BACKGROUND

In modern cloud and enterprise environments, effective security monitoring and forensic analysis depend heavily on comprehensive log data from distributed systems. Traditionally, this requires deploying agents directly onto virtual machines or servers to collect logs such as SSH access records, HTTP server logs, and system event files.

However, agent-based solutions present several challenges: they introduce operational overhead, consume compute resources, increase the attack surface, and may be incompatible with certain environments due to security or compliance restrictions.

Furthermore, real-time log streaming tools often provide only forward-looking visibility, limiting retrospective analysis when newly discovered vulnerabilities emerge. For example, if a critical vulnerability in a WordPress plugin is disclosed, organizations may lack the ability to examine past access logs to identify potential exploitation attempts. Sensor-based telemetry also varies in granularity and often omits valuable context unless explicitly configured.

In addition, log rotation mechanisms, such as logrotate, that compress or delete logs based on time or size, can result in permanent data loss if ingestion systems are not synchronized precisely. These constraints hinder the ability to perform timely and accurate detection, investigation, and response in security operations, especially in environments with complex infrastructure, dynamic workloads, and stringent storage limitations.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include detecting a resource deployed in a computing environment, the resource configured to generate a local log on a disk of the resource. The method may also include periodically fetching the local log from the disk, the local log including a plurality of event records written by at least a software application executed on the resource. The method may furthermore include applying a control on the fetched local log. The method may in addition include detecting a cybersecurity issue on the resource based on a result of applying the control. Other embodiments of this aspect include corresponding computer systems, apparatus, and computer programs recorded on one or more computer storage devices, each configured to perform the actions of the methods.

Implementations may include one or more of the following features. The method may include: generating a first state for the local log at a first time the local log is fetched; determining a second state for the local log at a second time the local log is fetched, which is after the first time; determining that the second state is different from the first state; and ingesting the local log in response to determining that the second state is different from the first state. The method may include: detecting a first data record associated with the first state; detecting a second data record associated with the second state; and ingesting only the second data record. The method may include: initiating a remediation action in the computing environment based on the cybersecurity issue. The method may include: receiving an attack definition, the attack definition generated after fetching the local log; and applying the attack definition on the fetched local log. The method may include: generating an enrichment for a security database based on the fetched local log, where the security database includes a representation of the computing environment; and applying the control further on the representation of the computing environment. The method may include: detecting a disk of the resource, where the disk includes a volume associated with the resource; generating an inspectable disk based on the detected disk; and initiating static analysis on the inspectable disk to detect the local log. The method may include: generating a representation in a security database of the software application; generating a representation in the security database of the resource, where the security database further includes a representation of the computing environment; and applying the control further on the representation of the computing environment. The method may include: configuring the resource to increase a data type written to the local log. The method may include: configuring the resource to decrease a data type written to the local log. Implementations of the described techniques may include hardware, a method or process, or a computer tangible medium.

In one general aspect, a non-transitory computer-readable medium may include one or more instructions that, when executed by one or more processing circuitries of a device, cause the device to: detect a resource deployed in a computing environment, the resource configured to generate a local log on a disk of the resource; periodically fetch the local log from the disk, the local log including a plurality of event records written by at least a software application executed on the resource; apply a control on the fetched local log; and detect a cybersecurity issue on the resource based on a result of applying the control. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: detect a resource deployed in a computing environment, the resource configured to generate a local log on a disk of the resource. The system may in addition periodically fetch the local log from the disk, the local log including a plurality of event records written by at least a software application executed on the resource. The system may moreover apply a control on the fetched local log. The system may also detect a cybersecurity issue on the resource based on a result of applying the control. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: generate a first state for the local log at a first time the local log is fetched; determine a second state for the local log at a second time the local log is fetched, which is after the first time; determine that the second state is different from the first state; and ingest the local log in response to determining that the second state is different from the first state. The system where the memory contains further instructions which when executed by the processing circuitry further configure the system to: detect a first data record associated with the first state; detect a second data record associated with the second state; and ingest only the second data record. The system where the memory contains further instructions which when executed by the processing circuitry further configure the system to: initiate a remediation action in the computing environment based on the cybersecurity issue. The system where the memory contains further instructions which when executed by the processing circuitry further configure the system to: receive an attack definition, the attack definition generated after fetching the local log; and apply the attack definition on the fetched local log. The system where the memory contains further instructions which when executed by the processing circuitry further configure the system to: generate an enrichment for a security database based on the fetched local log, where the security database includes a representation of the computing environment; and apply the control further on the representation of the computing environment. The system where the memory contains further instructions which when executed by the processing circuitry further configure the system to: detect a disk of the resource, where the disk includes a volume associated with the resource; generate an inspectable disk based on the detected disk; and initiate static analysis on the inspectable disk to detect the local log. The system where the memory contains further instructions which when executed by the processing circuitry further configure the system to: generate a representation in a security database of the software application; generate a representation in the security database of the resource, where the security database further includes a representation of the computing environment; and apply the control further on the representation of the computing environment. The system where the memory contains further instructions which when executed by the processing circuitry further configure the system to: configure the resource to increase a data type written to the local log. The system where the memory contains further instructions which when executed by the processing circuitry further configure the system to: configure the resource to decrease a data type written to the local log. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for collection and analysis of machine logs without the need for installing agents. Various embodiments utilizing existing inspection infrastructure to retrieve and process relevant log files in a dynamic and incremental fashion.

In some embodiments, the system maintains a state to track what logs have already been ingested, ensuring only new log data is processed. This approach facilitates backward-looking visibility into potential security events and supports dynamic log format configuration and publishing within the platform.

Figure 1:
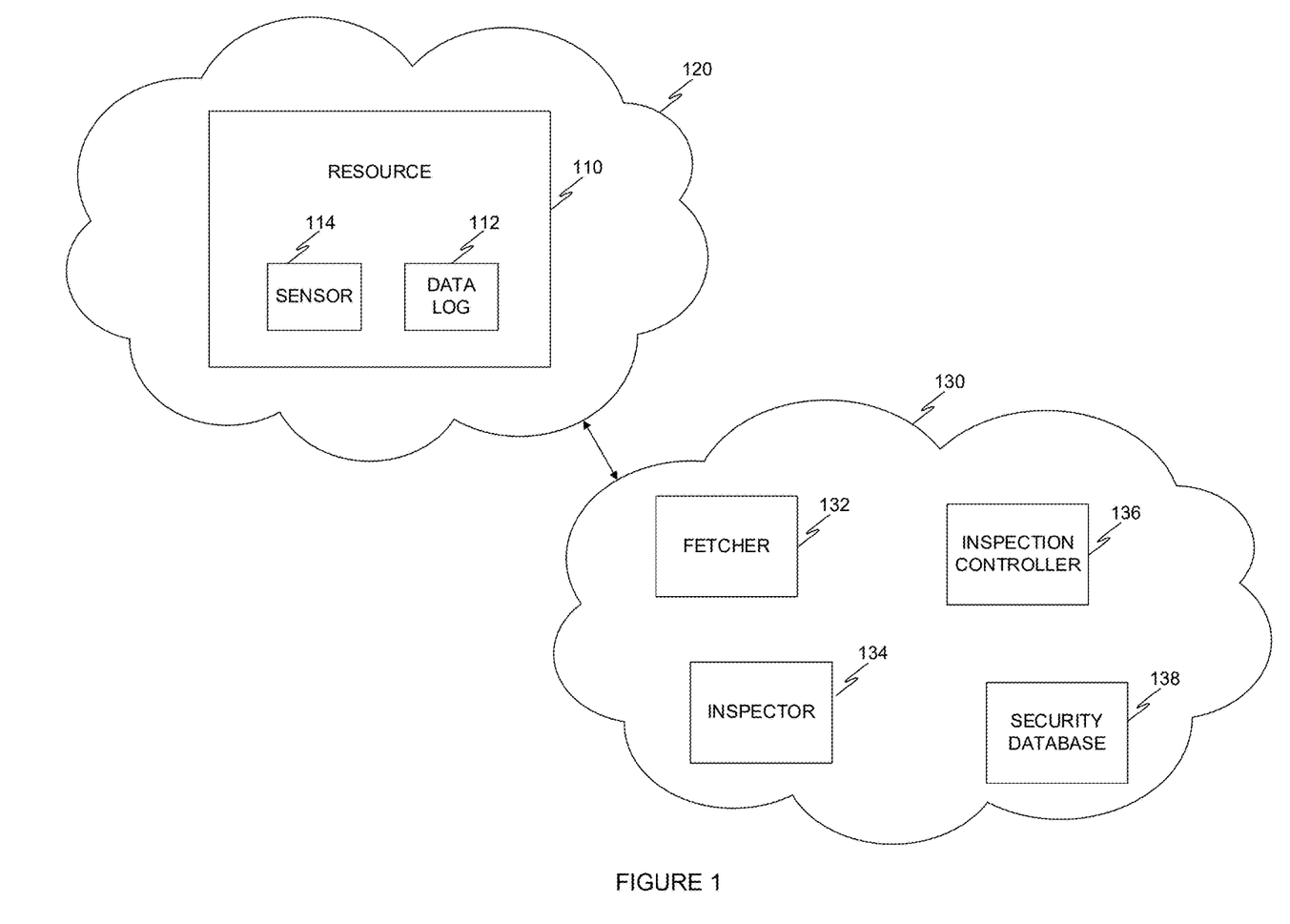
FIG. 1 is an example schematic diagram of a computing environment monitored by an inspection environment utilizing delayed log ingestion by agentless collection, implemented in accordance with an embodiment.

FIG. 1 is an example schematic diagram of a computing environment monitored by an inspection environment utilizing delayed log ingestion by agentless collection, implemented in accordance with an embodiment.

In an embodiment, a computing environment 120 includes a plurality of entities deployed therein, such as resources and principals. In certain embodiments, a computing environment 120 is a networked computing environment, an on-prem computing environment, a hybrid computing environment, a cloud computing environment, a combination thereof, and the like.

In some embodiments, a cloud computing environment is implemented on a cloud computing infrastructure provided by a cloud service provider (CSP) such as Amazon® Web Service (AWS), Microsoft® Azure, Google® Cloud Platform, and the like. In an embodiment, the computing environment 120 includes a virtual private cloud, a virtual network, a virtual private network, various combinations thereof, and the like.

According to an embodiment, the computing environment 120 includes a plurality of entities. In an embodiment, entities are resources, principals, and the like. In an embodiments, a resource 110 is a virtual machine, a software container, a serverless function, various combinations thereof, and the like.

In some embodiments, an entity is a principal, such as a user account, a service account, a role, a combination thereof, and the like. In an embodiment, a principal is an entity which is authorized to initiate actions in a computing environment.

In certain embodiments, the resource 110 has a software application deployed thereon. In an embodiment, the software application is configured to write events to a data log 112. In some embodiments, the resource 110 has a sensor 114 deployed thereon. In an embodiment, the sensor 114 is configured to detect runtime events initiated by processes executed on the resource 110.

According to an embodiment, an inspection environment 130 is configured to monitor the computing environment 120 for cybersecurity issues. In some embodiments, cybersecurity issues include cybersecurity risks, attacks, vulnerabilities, exploitations, exposures, a combination thereof, and the like.

In an embodiment, an inspection environment 130 includes a fetcher 132, an inspector 134, an inspection controller 136, a security database 138, various combinations thereof, and the like. In an embodiment, an inspection controller 136 is configured to initiate inspection of the computing environment 120. In some embodiments, the inspection controller 136 provisions, assigns, etc., a fetcher 132 to fetch the data log 112 from the resource 110.

In certain embodiments, an inspection controller 136 initiates generation of an inspectable disk. For example, in an embodiment, the resource 110 includes a disk, on which the data log 112 is stored. In an embodiment, the inspection controller 136 initiates generation of an inspectable disk, from which data of the data log 112 is accessible.

In some embodiments, generating an inspectable disk includes generating a snapshot (which is then mounted as a volume), generating a copy of the disk, generating a clone of the disk, etc.

In an embodiment, the fetcher 132 is configured to fetch the data log 112, a copy of the data log 112, etc., from an inspectable disk generated based on a disk of the resource 110. In certain embodiments, the fetcher 132 is configured to determine a state of the data log 112, and only fetch the data log 112 in response to determining that the state of the data log 112 changed.

According to an embodiment, determining a state of the data log 112 includes maintaining metadata for tracking the position within each log file previously ingested, enabling incremental processing without duplication. For example, if a web server log is rotated and archived after reaching a certain size, the fetcher 132 is configured to recognize the file's identity (e.g., via inode, checksum, timestamp, etc.) and resume parsing from the last read offset.

In an embodiment, determining a state of the data log 112 ensures only new entries are collected, even if the file has moved or been renamed. In some embodiments, stateful tracking allows handling log rotation, compression (e.g., gzip), and delayed access, while ensuring reliable, consistent ingestion across asynchronous inspection intervals.

In some embodiments, a resource 110 does not store a data log 112, but has the option to do so. In an embodiment, the inspection controller 136 is configured to configured the resource 110 to initiate writing events to the data log 112, to increase retention of the log (e.g., from 24 hours to 48 hours), decreasing retention of the log, increasing the type of data written (e.g., additional information per event record), various combinations thereof, and the like.

In an embodiment, ingested logs (i.e., event records ingested by the inspection environment 130) are stored in a security database 138. In some embodiments, the security database 138 includes a representation of the computing environment 120. In certain embodiments, a control is applied on the security database 138. In an embodiment, the control is applied on the representation of the computing environment 120, on the ingested event records, on a combination thereof, and the like. In some embodiments, the ingested event records are utilized in generating enrichments for representations stored in the security database 138. For example, an enrichment includes metadata associated with a resource.

In certain embodiments, the security database 138 is implemented as a columnar database, a graph database, an object-oriented database, a tabular database, a combination thereof, and the like.

In an embodiment, applying a control includes applying a rule, a condition, and the like, on a representation, on an event, etc. In some embodiments, an action is initiated in the computing environment 120 based on a result of applying the control.

In some embodiments, the control is applied to data ingested from a data log 112, data received from a sensor 114, detections from an inspector 134, a combination thereof, and the like. In an embodiment, the control includes an attack definition.

In an embodiment, the inspector 134 is configured to inspect an inspectable disk for a cybersecurity object. According to an embodiment, a cybersecurity object is a file, a folder, a filesystem, a cryptographic key, a password, a certificate, a hash value, a code object, a software container image, various combinations thereof, and the like.

In an embodiment, the cybersecurity object indicates a cybersecurity threat, risk, vulnerability, misconfiguration, exposure, a combination thereof, and the like. In some embodiments, a representation of the resource, a representation of the cybersecurity object, a representation of the cybersecurity threat, a representation of a remediation action, and the like, are all represented in the representation stored in the security database 138.

According to an embodiment, storing events from the data log 112 in the inspection environment 130 allows to perform detections retroactively. For example, while a sensor detects runtime events in real-time, it cannot detect zero-day exploitations, as they are not known attacks. By storing event data from the data log 112 in the inspection environment 130, it is possible to later query the security database 138 to detect events, indicators, and the like, in the stored data which indicate when a previously unknown attack (which is now know) occurred.

Figure 2:
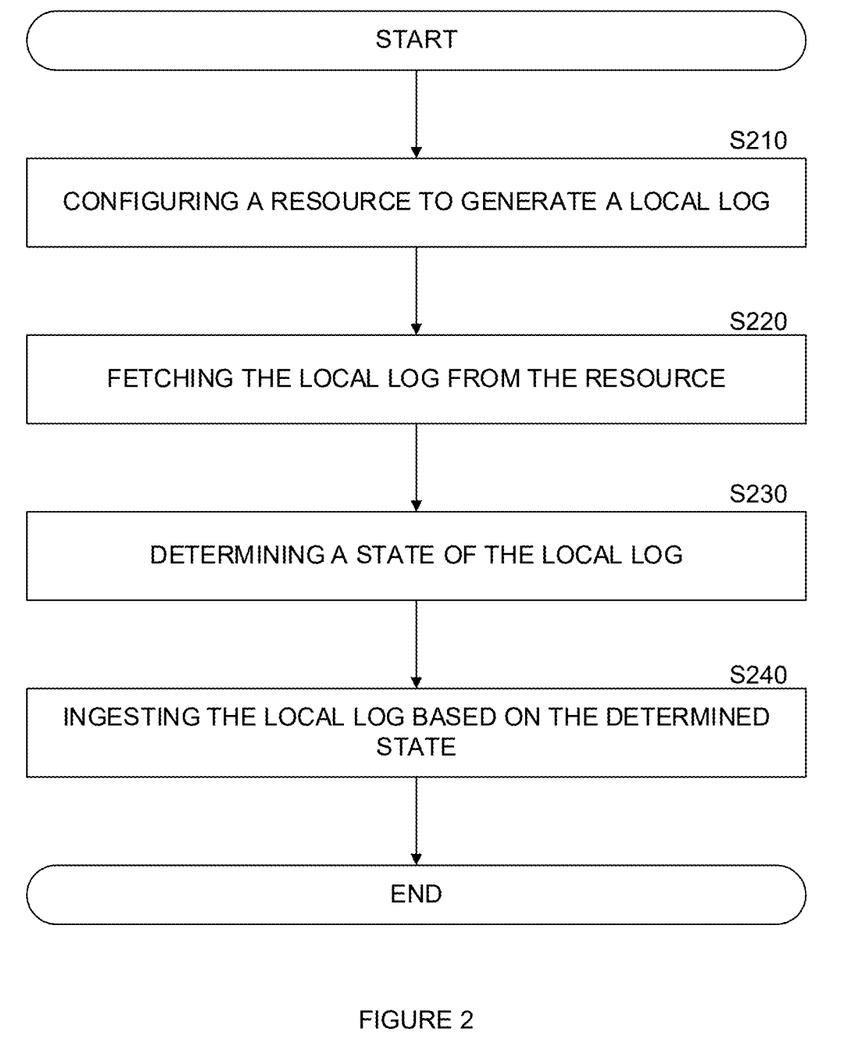
FIG. 2 is an example flowchart of a method for collecting logs from resources of a computing environment, implemented in accordance with an embodiment.

FIG. 2 is an example flowchart of a method for collecting logs from resources of a computing environment, implemented in accordance with an embodiment. In an embodiment, log collection is performed in a stateful manner, so as to avoid duplicated data.

At S210, a resource is configured to generate a local log. In an embodiment, a cloud resource, such as a virtual machine (VM) or container instance, is configured to store local logs by directing application-level, system-level, and the like outputs, to designated log files on attached persistent storage volumes.

For example, an Apache® web server running on a Linux-based VM can be configured via the 'httpd.conf' file to write access logs to '/var/log/httpd/access_log'. These log files reside on the local filesystem, which is typically backed by a block storage service (e.g., AWS EBS, Azure Disk) that persists across instance reboots.

Local logging daemons, such as 'rsyslog' or 'journald', can further route logs to specific files. Additionally, log rotation tools such as 'logrotate' can be configured to compress, archive, or delete logs based on time intervals or file size thresholds, helping manage disk usage.

In some embodiments, the resource is configured to generate a log based only on a portion of data which the resource generates. In certain embodiments, the resource is reconfigured to generate the log based on additional data which was not previously stored in the log.

At S220, a local log is fetched from the resource. In an embodiment, fetching a local log includes generating an inspectable disk based on a disk, volume, etc., of the resource. In some embodiments, the inspectable disk is generated based on a snapshot of the disk. In certain embodiments, the inspectable disk is generated based on a clone of the disk.

In an embodiment, the file system of the disk must be readable by snapshot-based or disk-scanning tools for downstream ingestion. For example, a cloud security platform can inspect the disk image offline via scheduled snapshots, extract relevant log files, and analyze entries without requiring runtime access or agents on the resource itself. This approach preserves operational isolation and minimizes performance impact.

At S230, a state of the log is determined. In an embodiment, determining the state of a log file includes identifying its unique identity, the last ingested position, and a combination thereof, to enable accurate, incremental ingestion.

In an embodiment, a log's state is represented by metadata such as file path, inode number (e.g., in Unix-like systems), last modified timestamp, file size, a cryptographic hash (e.g., SHA-256) of the file header or trailing lines, various combinations thereof, and the like. During each inspection cycle, a fetcher is configured to compare this stored metadata against the current state of log files on disk to determine whether the file has been appended to, rotated, renamed, overwritten, etc.

At S240, the local log is ingested based on the determined state. As an example, if a fetcher previously recorded that/var/log/nginx/access.log had 1,200 lines ingested up to byte offset 96,000, and during the next inspection the file has grown to 130,000 bytes with the same inode, the system reads and ingests only the delta, i.e., the additional 34,000 bytes beyond the last recorded offset. If the inode or hash has changed, indicating rotation or replacement (e.g., access.log has become access.log.1 and a new file is created), the fetcher is configured to reset the offset. In some embodiments, the fetcher is configured to correlate the rotated file's metadata to continue reading seamlessly.

According to an embodiment, redundant ingestion of previously processed data is prevented, and processing under log rotation schemes is therefore ensured. In some embodiments, state-based ingestion enables reconstitution of event timelines by preserving ingestion continuity. The stateful mechanism allows ingestion pipelines to scale across multiple resources, maintain ingestion integrity, and reduce unnecessary data transfer, which provides a benefit in bandwidth-constrained or cloud-native environments that rely on agentless inspection rather than persistent runtime access, or otherwise utilize agentless inspection to complement persistent runtime access of a sensor.

Figure 3:
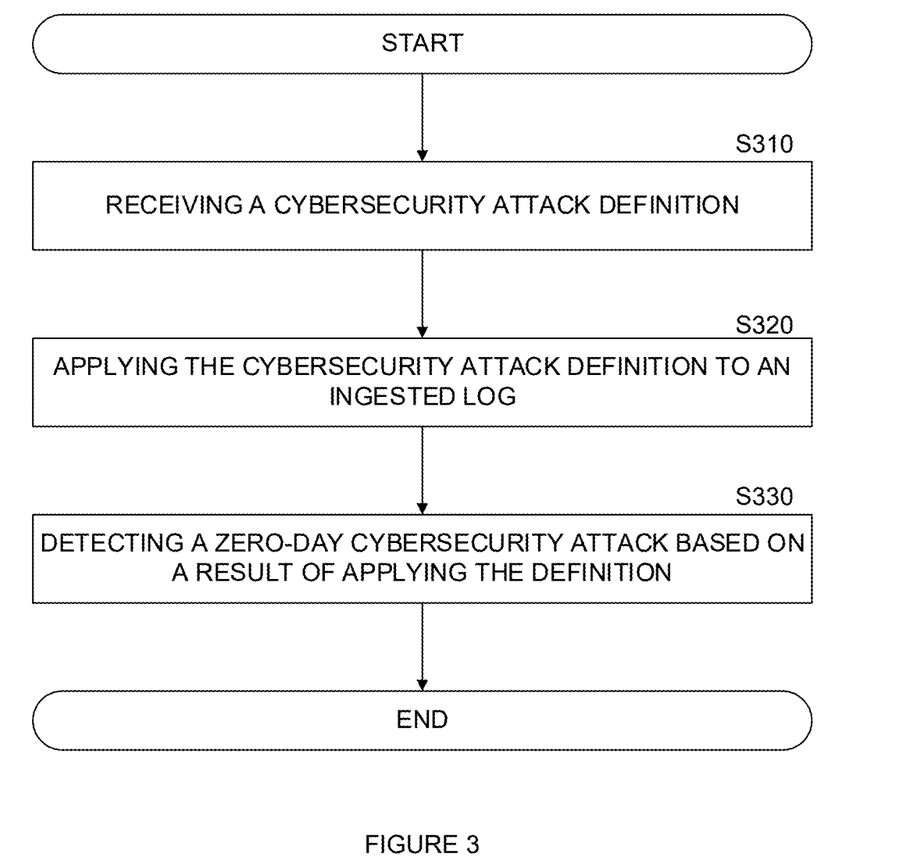
FIG. 3 is an example flowchart of a method for detecting a zero-day vulnerability based on delayed log ingestion, implemented in accordance with an embodiment.

FIG. 3 is an example flowchart of a method for detecting a zero-day vulnerability based on delayed log ingestion, implemented in accordance with an embodiment.

At S310, a definition of a cybersecurity attack is received. In an embodiment, a definition includes a well-defined detection rule, a threat signature describing the behavioral or syntactic characteristics of the exploit, various combinations thereof, and the like.

In an embodiment, a definition includes specific URL patterns, HTTP methods (e.g., GET, POST), query parameters, header values, shell command traces, access sequences that signify an attack vector, a combination thereof, and the like. For example, a rule targeting CVE-2025-XXXX might specify a URI regex such as/wp-content/plugins/vuln-plugin/.*\.\./.*, along with conditions on user-agent strings or source IP ranges.

In an embodiment, a definition is delivered as part of a threat intelligence feed. In certain embodiments, the definition is provided in a detection language such as YARA, Sigma, a proprietary policy DSL, and the like.

At S320, the definition is applied to a representation of a computing environment. In an embodiment, a received definition is applied to ingested logs through a rule-matching engine within the processing pipeline. In an embodiment, the engine is configured to parse each log entry into structured fields, such as timestamp, source IP, request path, headers, and payload, and evaluate log entries against a rule's conditions.

For instance, if a rule specifies that any HTTP GET request to/admin/export with a query parameter containing . . . / . . . / . . . /should trigger an alert, the engine is configured to utilize pattern matching (e.g., regular expressions) to scan the parsed request path and query string fields. According to an embodiment, log entries that satisfy all rule conditions are flagged as potential indicators of compromise (IOCs).

In certain embodiments, corresponding metadata, such as matched fields, originating IP, and time of event, is extracted. In an embodiment, extracted metadata is utilized in generating a cloud event, alert, and the like, which can be correlated, for example in a security database, with other findings. In some embodiments, the process is executed offline, enabling detection of attacks even in historical log data collected via delayed ingestion.

At S330, a cybersecurity threat is detected. In an embodiment, detecting a cybersecurity threat includes retrospectively analyzing historical log data after a vulnerability becomes known. When a new exploit (e.g., zero-day, one-day, etc.) is disclosed, such as a path traversal flaw in a WordPress™ plugin requiring access to a specific URL endpoint with crafted query parameters, ingested logs can be retroactively searched for patterns matching that exploit vector by a security database.

For example, once CVE details are released indicating that access to/wp-content/plugins/vuln-plugin/download.php?file= . . . / . . . /etc/passwd is indicative of compromise, the system is configured to scan past web server logs (e.g., Apache® or NGINX® access logs) for HTTP GET requests targeting that path with suspicious parameters.

Since the logs have been periodically collected and indexed from local machine storage (e.g., via the methods disclosed in more detail herein), even if the initial attack occurred days or weeks prior, the historical data is available for analysis. Furthermore, because the ingestion process preserves timestamps, source IPs, user-agents, and request metadata, combinations thereof, and the like, correlation engines can determine whether the exploit was attempted, how frequently, and by which origin IPs.

These insights allow analysts to identify the initial compromise window, scope lateral movement, and assess the blast radius, all without requiring real-time telemetry. In contrast to traditional real-time systems that may only store ephemeral data, this method ensures that forensic evidence remains accessible and queryable long after the event. By dynamically updating detection rules post-disclosure and applying them to existing logs, the platform effectively closes the gap between time-of-compromise and time-of-detection, which is critical in zero-day response scenarios.

Figure 4:
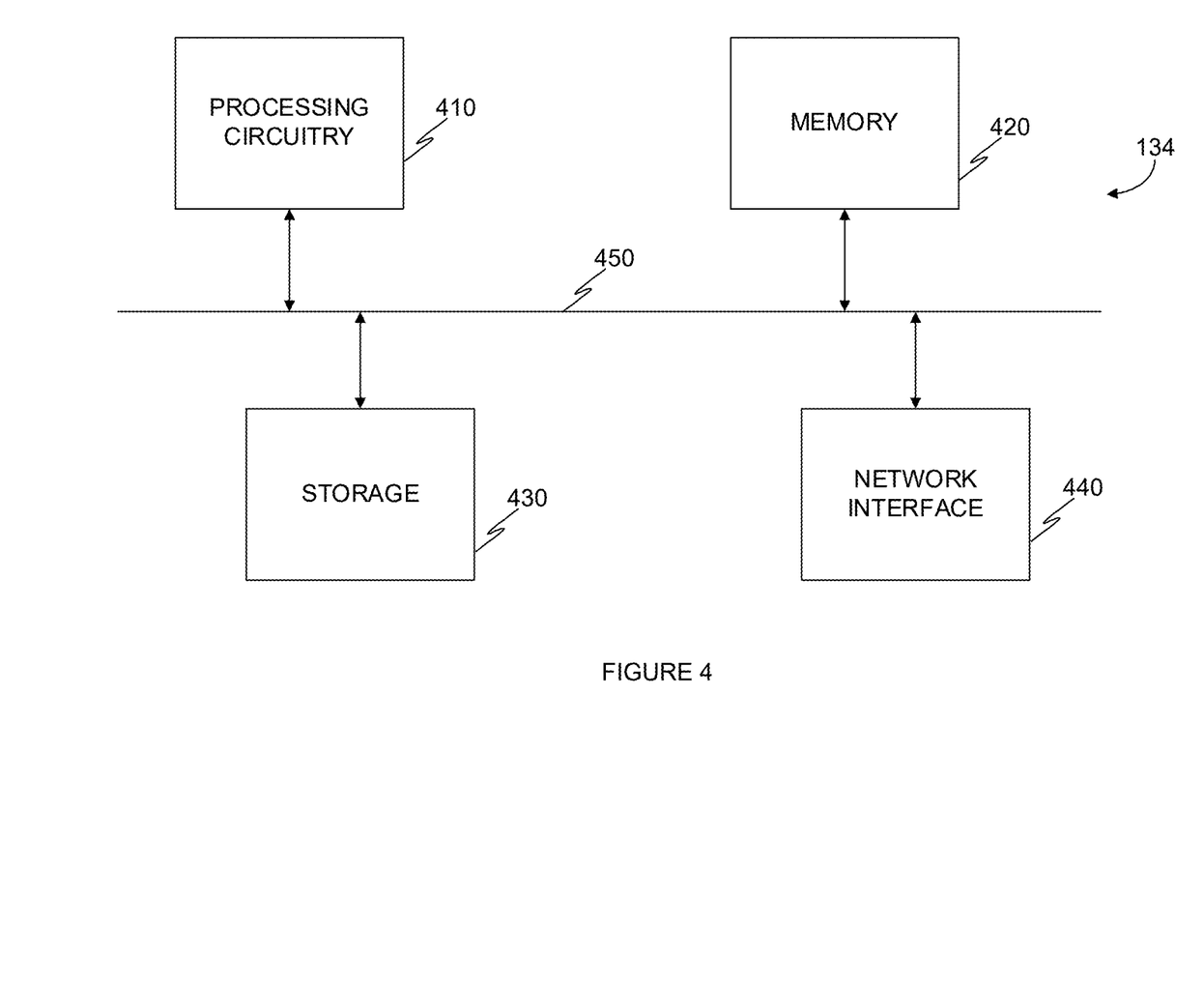
FIG. 4 is an example schematic diagram of an inspector according to an embodiment.

FIG. 4 is an example schematic diagram of an inspector 134 according to an embodiment. The inspector 134 includes, according to an embodiment, a processing circuitry 410 coupled to a memory 420, a storage 430, and a network interface 440. In an embodiment, the components of the inspector 134 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the inspector 134 with communication with, for example, the computing environment 120, the resource 110, an inspectable disk of the resource 110, the inspection environment 130, and the like, according to an embodiment.

It should be understood that the embodiments described herein are not limited to the specific architecture illustrated in FIG. 4, and other architectures may be equally used without departing from the scope of the disclosed embodiments.

Furthermore, in certain embodiments the fetcher 132, the inspector 134, the inspection controller 136, the security database 138, various combinations thereof, and the like, may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for ingesting delayed logs for cybersecurity detection, comprising:
   detecting a resource deployed in a computing environment, the resource configured to generate a local log on a disk of the resource;
   determining a state of the local log to detect new entries;
   periodically fetching only new entries of the local log from the disk, the local log including a plurality of event data records written by at least a software application executed on the resource;
   ingesting the new entries into a security database;
   applying a control including a definition of a cybersecurity attack on the ingested entries in the security database; and
   detecting a cybersecurity issue including a zero-day vulnerability on the resource based on a result of applying the control on the delayed log ingestion entries.

2. The method of claim 1, further comprising:
   generating a first state for the local log at a first time the local log is fetched;
   determining a second state for the local log at a second time the local log is fetched, which is after the first time;
   determining that the second state is different from the first state; and
   ingesting the local log in response to determining that the second state is different from the first state.

3. The method of claim 2, further comprising:
   detecting a first data record associated with the first state;
   detecting a second data record associated with the second state; and
   ingesting only the second data record.

4. The method of claim 1, further comprising:
   initiating a remediation action in the computing environment based on the cybersecurity issue.

5. The method of claim 1, further comprising:
   receiving an attack definition, the attack definition generated after fetching the local log; and
   applying the attack definition on the fetched local log.

6. The method of claim 1, further comprising:
   generating an enrichment for a security database based on the fetched new entries, wherein the security database includes a representation of the computing environment; and
   applying the control further on the representation of the computing environment.

7. The method of claim 1, further comprising:
   detecting a disk of the resource, wherein the disk includes a volume associated with the resource;
   generating an inspectable disk based on the detected disk; and
   initiating static analysis on the inspectable disk to detect the local log.

8. The method of claim 7, further comprising:
   generating a representation in a security database of the software application;
   generating a representation in the security database of the resource, wherein the security database further includes a representation of the computing environment; and
   applying the control further on the representation of the computing environment.

9. The method of claim 1, further comprising:
   configuring the resource to increase a data type written to the local log.

10. The method of claim 1, further comprising:
    configuring the resource to decrease a data type written to the local log.

11. A non-transitory computer-readable storage medium storing a set of instructions for ingesting delayed logs for cybersecurity detection, the set of instructions comprising:
    one or more instructions that, when executed by one or more processing circuitries of a device, cause the device to:
       detect a resource deployed in a computing environment, the resource configured to generate a local log on a disk of the resource;
       determine a state of the local log to detect new entries;
       periodically fetch only new entries of the local log from the disk, the local log including a plurality of event data records written by at least a software application executed on the resource;
       ingest the new entries into a security database;
       apply a control including a definition of a cybersecurity attack on the ingested entries in the security database; and
       detect a cybersecurity issue including a zero-day vulnerability on the resource based on a result of applying the control on the delayed log ingestion entries.

12. A system for ingesting delayed logs for cybersecurity detection comprising:
    a processing circuitry;
    a memory, the memory containing instructions that, when executed by the processing circuitry, configure the system to:
    detect a resource deployed in a computing environment, the resource configured to generate a local log on a disk of the resource;
    determine a state of the local log to detect new entries
    periodically fetch only new entries of the local log from the disk, the local log including a plurality of event data records written by at least a software application executed on the resource;
    ingest the new entries into a security database;
    apply a control including a definition of a cybersecurity attack on the ingested entries in the security database; and
    detect a cybersecurity issue including a zero-day vulnerability on the resource based on a result of applying the control on the delayed log ingestion entries.

13. The system of claim 12, wherein the memory contains further instructions which when executed by the processing circuitry further configure the system to:
    generate a first state for the local log at a first time the local log is fetched;
    determine a second state for the local log at a second time the local log is fetched, which is after the first time;
    determine that the second state is different from the first state; and
    ingest the local log in response to determining that the second state is different from the first state.

14. The system of claim 13, wherein the memory contains further instructions which when executed by the processing circuitry further configure the system to:
    detect a first data record associated with the first state;
    detect a second data record associated with the second state; and
    ingest only the second data record.

15. The system of claim 12, wherein the memory contains further instructions which when executed by the processing circuitry further configure the system to:

initiate a remediation action in the computing environment based on the cybersecurity issue.

16. The system of claim 12, wherein the memory contains further instructions which when executed by the processing circuitry further configure the system to:
receive an attack definition, the attack definition generated after fetching the local log; and
apply the attack definition on the fetched local log.

17. The system of claim 12, wherein the memory contains further instructions which when executed by the processing circuitry further configure the system to:
generate an enrichment for a security database based on the fetched new entries, wherein the security database includes a representation of the computing environment; and
apply the control further on the representation of the computing environment.

18. The system of claim 12, wherein the memory contains further instructions which when executed by the processing circuitry further configure the system to:
detect a disk of the resource, wherein the disk includes a volume associated with the resource;
generate an inspectable disk based on the detected disk; and
initiate static analysis on the inspectable disk to detect the local log.

19. The system of claim 18, wherein the memory contains further instructions which when executed by the processing circuitry further configure the system to:
generate a representation in a security database of the software application;
generate a representation in the security database of the resource, wherein the security database further includes a representation of the computing environment; and
apply the control further on the representation of the computing environment.

20. The system of claim 12, wherein the memory contains further instructions which when executed by the processing circuitry further configure the system to:
configure the resource to increase a data type written to the local log.

21. The system of claim 12, wherein the memory contains further instructions which when executed by the processing circuitry further configure the system to:
configure the resource to decrease a data type written to the local log.

* * * * *